United States Patent
Molinaro et al.

(10) Patent No.: US 9,863,488 B2
(45) Date of Patent: Jan. 9, 2018

(54) DRUM BRAKE OPERATING IN SIMPLEX MODE AND/OR IN SERVO-DUAL MODE

(71) Applicant: CHASSIS BRAKES INTERNATIONAL B.V., Amsterdam (NL)

(72) Inventors: Alberto Molinaro, Noisy le Grand (FR); Christophe Dupas, Palaiseau (FR); Gerard Luu, Noisy le Grand (FR); Cedric Guignon, Noiseau (FR)

(73) Assignee: CHASSIS BRAKES INTERNATIONAL B.V., Eindhoven (NL)

( * ) Notice: Subject to any disclaimer, the term of this patent is extended or adjusted under 35 U.S.C. 154(b) by 0 days.

(21) Appl. No.: 15/037,558

(22) PCT Filed: Nov. 10, 2014

(86) PCT No.: PCT/EP2014/074159
§ 371 (c)(1),
(2) Date: May 18, 2016

(87) PCT Pub. No.: WO2015/074907
PCT Pub. Date: May 28, 2015

(65) Prior Publication Data
US 2016/0290419 A1    Oct. 6, 2016

(30) Foreign Application Priority Data

Nov. 19, 2013 (FR) ..................................... 13 61342

(51) Int. Cl.
*F16D 51/24* (2006.01)
*F16D 51/50* (2006.01)
(Continued)

(52) U.S. Cl.
CPC ............. *F16D 51/50* (2013.01); *F16D 51/24* (2013.01); *F16D 2121/02* (2013.01);
(Continued)

(58) Field of Classification Search
CPC .......... F16D 51/18; F16D 51/22; F16D 51/24; F16D 51/50; F16D 65/0006; F16D 65/22;
(Continued)

(56) References Cited

U.S. PATENT DOCUMENTS

| 3,809,191 A | * | 5/1974 | Woodward | ............ B60T 13/741 |
| | | | | 188/106 A |
| 4,369,863 A | * | 1/1983 | Farr | ........................ F16D 51/18 |
| | | | | 188/106 A |

(Continued)

FOREIGN PATENT DOCUMENTS

DE    10 2006 009089 A1    8/2007

OTHER PUBLICATIONS

International Search Report, dated Feb. 4, 2015, from corresponding PCT application.

(Continued)

*Primary Examiner* — Christopher Schwartz
(74) *Attorney, Agent, or Firm* — Young & Thompson

(57) ABSTRACT

A motor vehicle drum brake (10) includes: two braking segments (18A, 18B); an anchoring element (28) including two bearing surfaces (32A, 32B) of two second ends (24) of the braking segments (18A, 18B); a wheel cylinder (34) which, in a first "simplex" operating mode, is suitable for transversally separating the adjacent first ends (22) of the segments (18A, 18B); the anchoring element (28) including: a fixed body (42) wherein two sliding pistons (50A, 50B) each carry a bearing surface (32A, 32B); and elements (44) for separating the pistons (50A, 50B) between an anchoring position wherein they abut against the body (42), and a (Continued)

sliding position wherein the pistons (32A, 32B) are separated to allow the sliding thereof during operation in so-called "servo-dual" mode.

22 Claims, 8 Drawing Sheets

(51) Int. Cl.
 F16D 121/02 (2012.01)
 F16D 121/14 (2012.01)
 F16D 121/24 (2012.01)
 F16D 123/00 (2012.01)
 F16D 125/40 (2012.01)
 F16D 125/48 (2012.01)
 F16D 125/52 (2012.01)
 F16D 125/60 (2012.01)
 F16D 125/68 (2012.01)

(52) U.S. Cl.
 CPC ...... F16D 2121/14 (2013.01); F16D 2121/24 (2013.01); F16D 2123/00 (2013.01); F16D 2125/40 (2013.01); F16D 2125/48 (2013.01); F16D 2125/52 (2013.01); F16D 2125/60 (2013.01); F16D 2125/68 (2013.01)

(58) Field of Classification Search
 CPC ............. F16D 65/565; F16D 2065/386; F16D 2121/02; F16D 2121/24
 USPC .................. 188/72.7, 78, 329–332, 338, 339
 See application file for complete search history.

(56) References Cited

U.S. PATENT DOCUMENTS

| 4,730,707 | A | * | 3/1988 | Edwards | ................ | F16D 51/18 |
| | | | | | | 188/326 |
| 5,275,260 | A | | 1/1994 | Evans et al. | | |
| 5,806,635 | A | * | 9/1998 | Bae | ........................ | F16D 65/22 |
| | | | | | | 188/106 F |
| 2006/0278477 | A1 | * | 12/2006 | Balz | ....................... | F16D 51/48 |
| | | | | | | 188/156 |

OTHER PUBLICATIONS

FR Search Report, dated Sep. 4, 2014, from corresponding FR application.

* cited by examiner

DRUM BRAKE OPERATING IN SIMPLEX MODE AND/OR IN SERVO-DUAL MODE

TECHNICAL FIELD OF THE INVENTION

The invention relates to a motor vehicle drum brake including two opposite braking segments, an anchoring element inserted transversally between facing ends of the braking segments and a wheel cylinder suitable for transversally separating the two opposite ends of the braking segments.

TECHNICAL BACKGROUND OF THE INVENTION

The invention relates more particularly to a motor vehicle drum brake including:
  a fixed transversal plate;
  a drum rotatably mounted with respect to the plate and equipped with a peripheral friction skirt;
  two opposite braking segments including first transversally facing ends and second transversally facing opposite ends;
  an anchoring element inserted transversally between the second ends of the braking segments such that each second end is elastically forced to pivotably transversally bear against an associated bearing surface of the anchoring element;
  a wheel cylinder which, in a first so-called "simplex" operating mode of the drum brake, is suitable for transversally separating the two adjacent first ends of the braking segments, pivoting the braking segments about the fixed bearing surface thereof with respect to the plate, to apply a friction surface of each braking segment against the friction skirt.

Drum brakes of this type, also called "floating segment drum brakes" as the segments bear on the anchoring element without being attached thereto are already known. This enables automatic centring of the segments when they are applied against the peripheral friction skirt of the drum.

The drum brakes are conventionally used alternatively as a service brake, and as a parking brake.

During use as a service brake, the drum brake makes it possible to slow down or even immobilise the vehicle. During this use, the driver controls the intensity of the braking torque applied by the drum brake by means of a first control member such as a brake pedal.

During use as a parking brake, the drum is used to immobilise the stationed vehicle. The drum brake is then controlled in "on/off" mode so as to apply a powerful braking torque to the vehicle wheel. During this use, the driver generally controls the drum brake by means of a second control member, for example by means of a hand brake pulling a brake cable.

This type of brake is satisfactory for service brake use as it makes it possible to distribute wear over the entire surface of the friction linings. Nevertheless, it has been observed that the braking torque could be insufficient for use as a parking brake.

BRIEF SUMMARY OF THE INVENTION

The invention relates to a drum brake of the type described above, characterised in that the anchoring element includes:
  a fixed body with respect to the plate;
  two pistons, each carrying an associated bearing surface and which are slidably mounted transversally in the body,
  controlled means for transversal separation of the bearing surfaces between an anchoring position wherein the pistons are clamped simultaneously against an associated abutment surface of the body by the associated segments to enable operation in "simplex" mode of the drum brake, the body acting as a fixed brace, and a sliding position wherein the bearing surfaces are separated from one another, the separating means acting as a sliding brace to enable rigidly connected and free sliding of the bearing pistons with respect to the fixed body during operation in so-called "servo-dual" mode of the drum brake.

According to further features of the invention:
  the separation of the two bearing surfaces in the sliding position is sufficient to enable the clamping of the two braking segments against the friction skirt;
  the separation means include a lever including a first actuation end and a second hinge end, the level bearing transversally by an intermediate section on a pivot which is slidably rigidly connected with the first piston of the anchoring element, the second end of the lever being hinged with a first end of a connecting rod, the second end of the connecting rod being suitable for actuating the second piston transversally, the lever being pivotably controlled between:
    an idle position wherein the connecting rod is inclined with respect to the transversal direction such that the two bearing surfaces occupy the anchoring position thereof;
    an active position wherein the lever bears transversally on the first piston to actuate the second piston by pivoting the connecting rod towards the transversal direction in order to separate the two bearing surfaces to the sliding position thereof;
  in the sliding position of the bearing surfaces, the main axis of the connecting rod is oriented substantially transversally;
  the actuation end of the lever is suitable for being pulled to the active position thereof by means of a brake cable including an end for fastening on the lever and a pulling end whereon an actuation force is applied;
  the separation means include a screw-nut mechanism suitable for controlling the transversal separation between the two bearing surfaces by the relative rotation of the screw with respect to the nut which applies an actuation force on the second piston;
  the rotation of the nut or the screw is controlled by an electric motor;
  the rotation of the nut or the screw is controlled by means of an endless screw equipped with a helicoidal groove and driven by the electric motor, the endless screw being engaged with the teeth of a pinion rigidly connected in rotation with the nut or the screw, the axis of rotation of the endless screw being arranged so as to enable transversal sliding of the pinion with respect to the endless screw while maintaining the relative engagement thereof;
  the electric motor rotates the nut or the screw by means of at least one cogwheel engaged with the teeth of a pinion borne by the nut or the screw;
  the separation means include a wedge which is slidably mounted orthogonally to the transversal direction between a retracted position wherein the two bearing surfaces occupy the anchoring position thereof, and an actuated position wherein the two bearing surfaces occupy the sliding position thereof and towards which it is pulled by an actuation force, the wedge being inserted transversally between the two pistons and the wedge being slidably mounted transversally in a rigidly connected manner with the bearing surfaces;

the drum brake includes an elastic member of defined stiffness which is inserted in the actuation force transmission chain to one of the two pistons;

the elastic member is inserted between two separate strands of the brake cable;

the elastic member is inserted between the intermediate portion of the lever and one of the two pistons;

the elastic member is inserted between:
 the screw or the nut, and
 the first piston or the second piston.

The invention also relates to a method for using the drum brake embodied according to the teachings of the invention, characterised in that, during the use of the drum brake in "servo-dual" mode, the wheel cylinder is idle, only the separation means being actuated to apply the brake segments against the skirt of the drum.

BRIEF SUMMARY OF THE FIGURES

Further features and advantages of the invention will emerge on reading the detailed description hereinafter for the comprehension whereof reference will be made to the appended figures wherein.

DETAILED DESCRIPTION OF THE FIGURES

Hereinafter in the description, the longitudinal, vertical and transversal orientations indicated by the trihedron "L,V,T" in the figures will be adopted in a non-limiting manner. The longitudinal orientation "L" is directed from rear to front.

Hereinafter in the description, with reference to FIGS. 2 to 9, the transverse direction will be directed, the terms "inner" and "outer" will be used to orient the transversal direction from the inside of the bore 46 of the anchoring element 28, to the outside of said bore 46, in both directions.

Hereinafter in the description, elements having an identical structure or equivalent functions will be denoted by the same reference.

Figure 1:
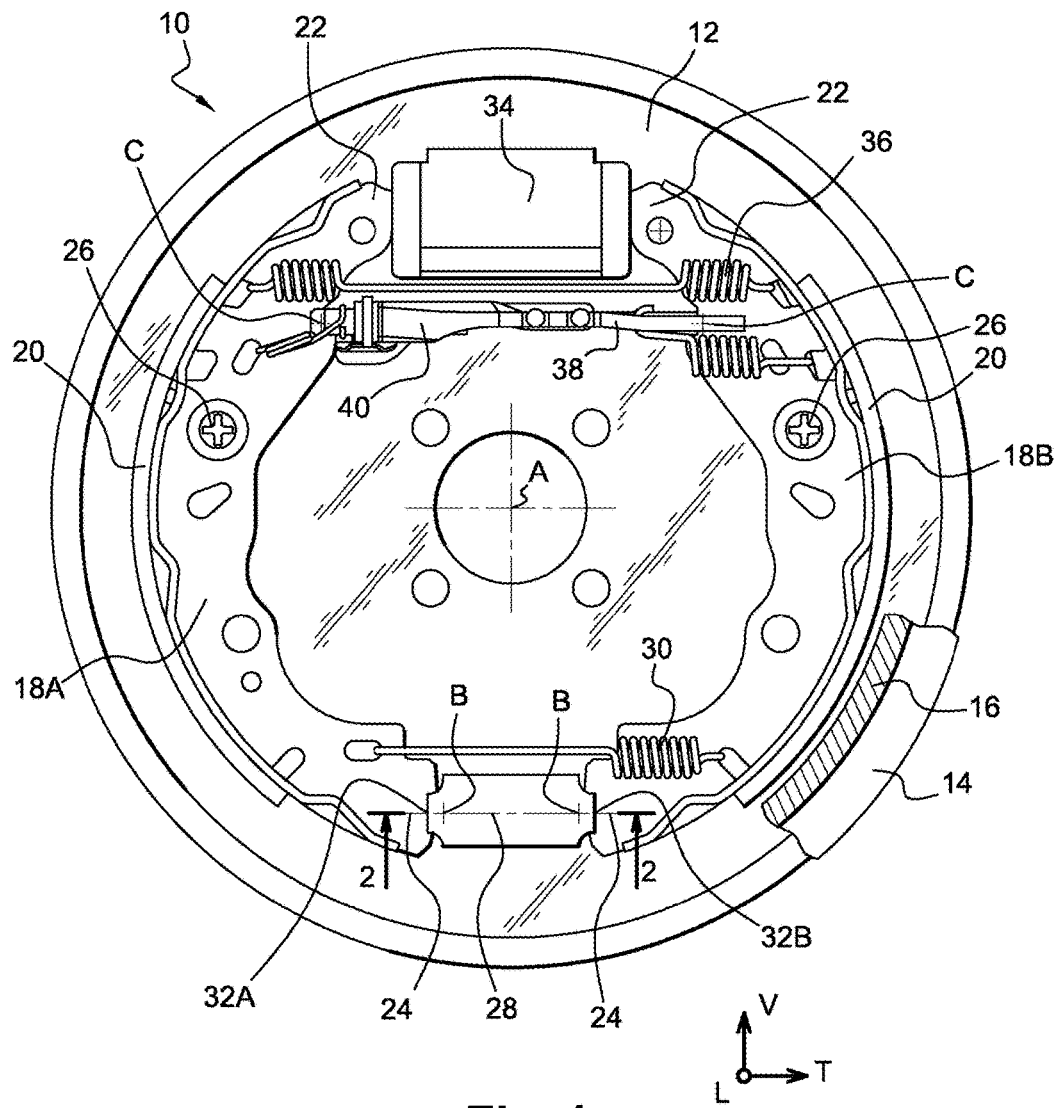
FIG. 1 is a front view with cutaway of the drum representing a drum brake embodied according to the teachings of the invention.

FIG. 1 represents a drum brake 10 which is intended to be mounted on a motor vehicle wheel (not shown) rotatably mounted about a longitudinal rotational axis "A". It consists of a drum brake 10 which is suitable for being used alternatively a service brake and as a parking brake.

The drum brake 10 includes a plate 12 which is fixedly mounted with respect to the motor vehicle chassis. The brake 12 extends in an overall transverse plane with respect to the axis "A" of the wheel.

The drum brake 10 also includes a drum 14 only one part whereof has been represented in FIG. 1 and which is suitable for bearing an associated wheel (not shown). The drum 14 includes a cylindrical annular skirt 16 wherein the inner surface forms a friction track. The skirt 16 extends longitudinally forwards from a front surface of the plate 12 and it is coaxially mounted with the axis "A" of the wheel. The drum 14 is thus rotatably mounted with respect to the plate 12.

A first braking segment 18A and a second braking segment 18B are mounted on the plate 12. The first braking segment 18A is arranged to the left in FIG. 1, whereas the second braking segment 18B is arranged to the right.

The two braking segments 18A, 18B exhibit herein an identical structure and arrangement by symmetry with respect to a longitudinal vertical plane passing through the rotational axis "A". Only the first braking segment 18A will thus be described hereinafter.

The first braking segment 18A extends generally vertically to the inside of the drum 14. The first braking segment 18A has a curvature centred on the rotational axis "A", corresponding to that of the skirt 16. The first braking segment 18A has an outer friction surface 20 which is facing the inner friction track of the skirt 16. The friction surface 20 also has a curvature corresponding to that of the inner skirt 16 of the drum 14.

The first braking segment 18A includes a first upper end 22 and a second lower end 24. Due to the symmetric arrangement of the two braking segments 18A, 18B, the first upper ends 22 thereof are arranged transversally facing one another and the second lower ends 24 thereof are arranged transversally facing one another.

The braking segments 18A, 18B are mounted floating on the plate 22 by means of an associated holding assembly 26 including a nut and a spring.

An anchoring element 28 is inserted transversally between the lower ends 24 of the segments 18A, 18B. The anchoring element 28 is attached to the plate 12. A first elastic return means 30, herein formed by a spring, is stretched between the two lower ends 24 of the segments 18A, 18B such that the lower end 24 of the first braking segment 18A, or the second braking segment 18B, respectively, is elastically forced to pivotably transversally bear against a first bearing surface 32A, or a second bearing surface 32B, respectively, of the anchoring element 28. Each bearing surface 32A, 32B extends in a longitudinal vertical plane and faces the associated segment 18A, 18B.

The drum brake 10 also includes a hydraulic wheel cylinder 34 inserted transversally between the upper ends 22 of the braking segments 18A, 18B. The wheel cylinder 34 is attached to the plate 12. It includes two opposed pistons (not shown) slidably transversally mounted in a hydraulic chamber. Each piston is intended to bear transversally on the upper end 22 of the associated braking segment 18A, 18B.

The wheel cylinder 34 is intended to be actuated during use of the drum brake 10 in a first so-called "simplex" operating mode corresponding for example to use as a service brake.

In this operating mode, the bearing surfaces 32A, 32B of the anchoring element 28 are fixed with respect to the plate 12. Each segment 18A, 18B is thus suitable for pivoting by the lower end 24 thereof about a fixed point defining a longitudinal pivoting axis "B" between:

an idle position wherein it is returned elastically to the axis "A" of the drum 14 with a defined radial clearance with respect to the skirt 16, and an active position wherein the friction surface 20 is applied against the friction surface of the skirt 16.

The pistons of the wheel cylinder 34 are thus suitable for transversally separating the two adjacent upper ends 22 to actuate the braking segments 18A, 18B to the active position thereof once the fluid pressure rises in the hydraulic chamber of the wheel cylinder 40.

The elastic return of the braking segments 28A, 28B to the idle position thereof is carried out by means of the first elastic return means 30 and by means of a second elastic return means 36, in this case a spring, which is stretched transversally between the two upper ends 22 of the braking segments 18A, 18B.

Moreover, in the idle position thereof, the two braking segments 18A, 18B are kept separated from one another by a connecting rod 38 extending transversally between two upper positions of the braking segments 18A, 18B. The connecting rod 38 is herein equipped with a wear clearance compensation mechanism 40 making it possible to keep the braking segments 18A, 18B separated by a constant radial clearance with respect to the drum 14 in the idle position thereof, regardless of the wear of the friction surfaces 20.

The connecting rod 38 is received pivotably bearing about a longitudinal axis "C" on each braking segment 18A, 18B.

In this "simplex" operating mode, when the drum 14 rotates in an anticlockwise direction with reference to FIG. 1, the first braking segment 18A is clamped by the wheel cylinder 34 against the skirt 16. Due to the friction, the rotation of the drum 14 actuates the first braking segment 18A. The first braking segment 18A is then compressed circumferentially against the first associated bearing surface 32A of the anchoring element 28.

Simultaneously, the second braking segment 18B on the left is on the other hand actuated by the drum 14, due to the friction, circumferentially towards the wheel cylinder 34. The second braking segment 18B thus tends to be separated from the second associated bearing surface 32B.

The first braking segment 18A is thus said to be "compressed", whereas the second braking segment 18B is said to be "stretched". In this "simplex" operating mode, the braking segments 18A, 18B do not apply any force on one another.

The drum brake 10 according to the invention is intended to operate according to a second so-called "servo-dual" mode wherein the two segments 18A, 18B are suitable for being both compressed during the application thereof against the skirt 16 of the drum 14. This operation in "servo-dual" mode is particularly intended for use of the drum brake 10 as a parking brake as it makes it possible to obtain powerful braking causing very rapid locking of the vehicle wheels.

Figure 2:
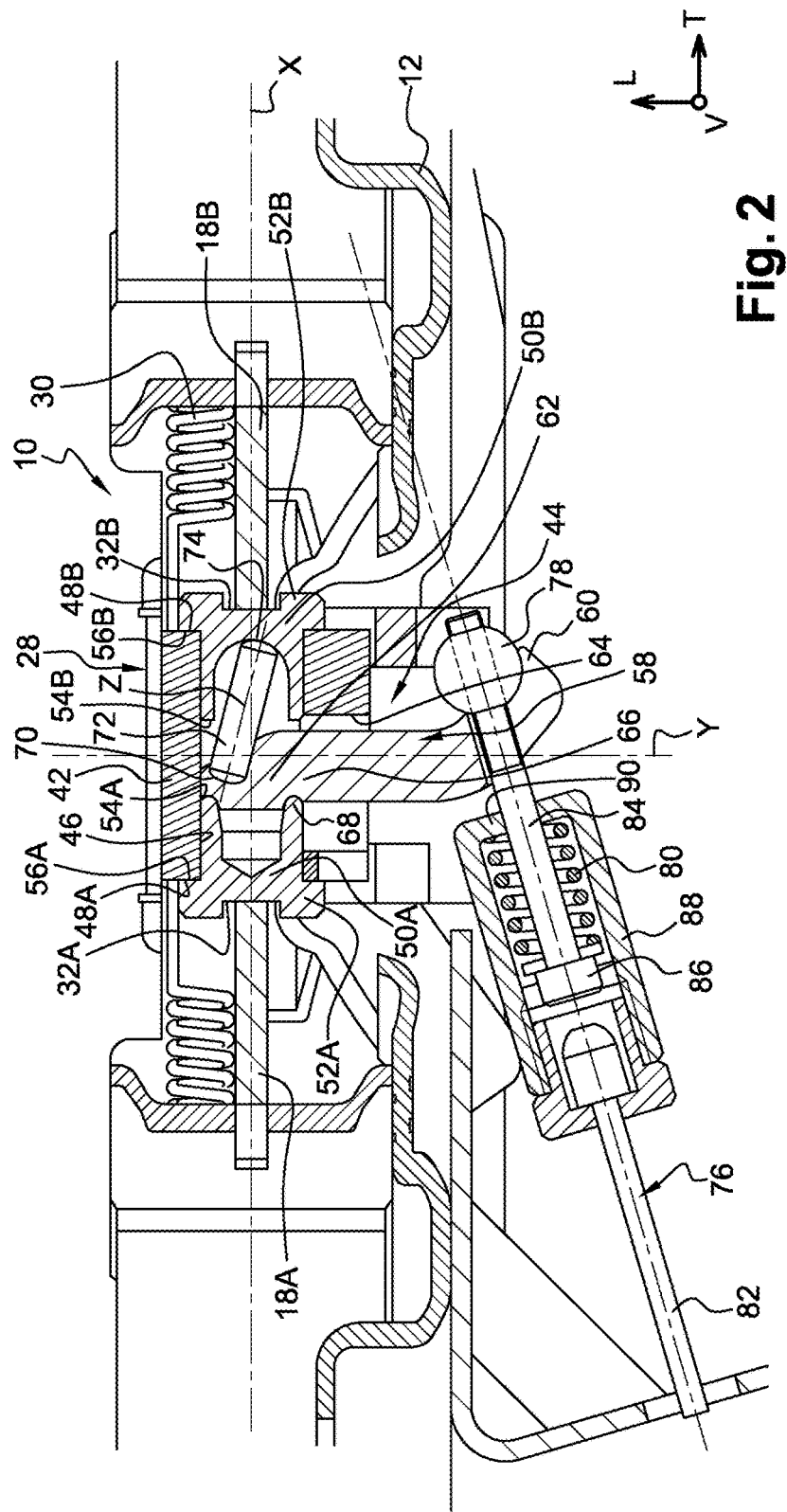
FIG. 2 is a sectional view along the sectional plane 2-2 in FIG. 1 representing means for separating the bearing surfaces of the drum brake segments embodied according to a first embodiment of the invention, the bearing surfaces occupying a first anchoring position.
Figure 5:
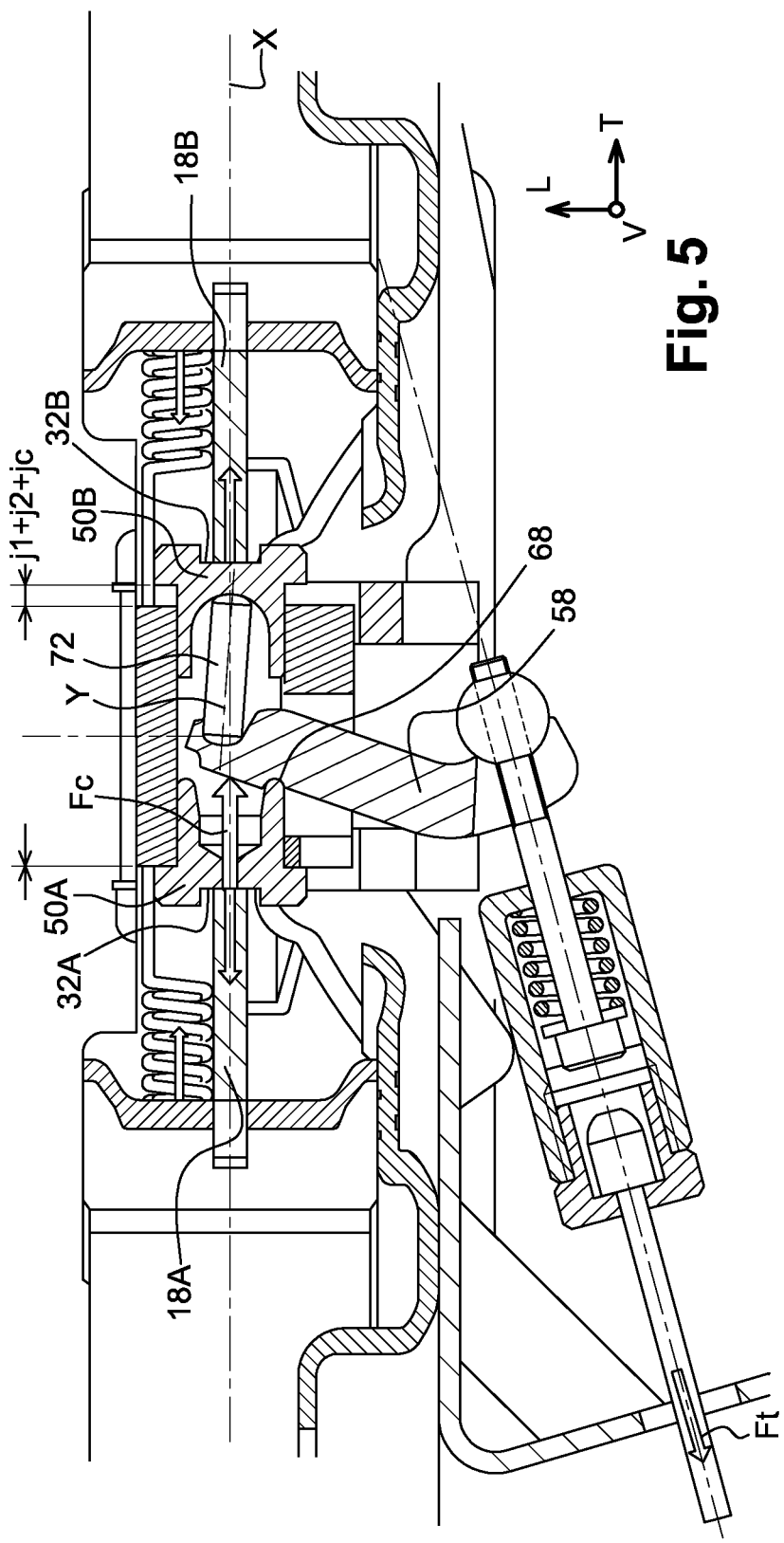
FIG. 5 is a similar view to that in FIG. 2 wherein the braking segments are both compressed to lock the rotation of the drum.

To embody such a drum brake 10, the anchoring element 28 includes a fixed body 42 with respect to the plate 12. The fixed body 42 wherein each bearing surface 32A, 32B is transversally slidably mounted. Means 44 for transversally separating the bearing surfaces 32A, 32B suitable for controlling the bearing surfaces 32A, 32B between:

an anchoring position wherein the two bearing surfaces 32A, 32B transversally surround the body 42, as represented in FIG. 2;

a sliding position wherein the bearing surfaces 32A, 32B are separated from one another, as represented in FIG. 5, wherein the separation means 44 act as a sliding brace to enable the rigidly connected and free sliding of the bearing surfaces 32A, 32B with respect to the fixed body 42 during "servo-dual" mode operation of the drum brake 10.

FIGS. 2 to 5 represent in detail a first embodiment of the anchoring element 28 and the separation means 44.

The body 42 has a cylindrical bore 46 of transversal axis opening transversally on both sides via two end openings. The periphery of the end opening leading to the first braking segment 18A has a first longitudinal vertical abutment surface 48A, whereas the periphery of the end opening leading to the second braking segment 18B has a second longitudinal vertical abutment surface 48B.

The first bearing surface 32A, or the second bearing surface 32B respectively, is borne by the associated first piston 50A, or by a second piston 50B, respectively. The pistons 50A, 50B are slidably mounted transversally in opposition in the bore 46 along a common transversal axis "X". Each piston 50A, 50B has a transversal tail end which has an equivalent cross-section to that of the bore 46 for the sliding guiding thereof. Each tail end of a piston 50A, 50B is defined transversally by a free outer end head 52A, 52B which is arranged outside the bore 46 and an opposite inner end surface 54A, 54B which is arranged transversally facing the inner surface 54B, 54A of the other piston 50B, 50A.

The outer surface of the head 50A, 50B bears the bearing surface 32A, 32B of the associated braking segment 18A, 18B. To prevent the segment 18A, 18B from escaping longitudinally from the bearing surface 32A, 32B, each bearing surface 32A, 32B is herein formed by the base of a vertical groove formed in the outer surface of the head 50A, 50B.

Each head 52A, 52B has a greater cross-section that that of the bore 46. The vertical longitudinal surface 56A, 56B of the head 52A, 52B which is facing the body 42 forms a stopping surface 56A, 56B which is intended to come into contact with the associated abutment surface 48A, 48B of the body 42 to stop the sliding of each piston 50A, 50B to the other piston 50B, 50A. When the two pistons 50A, 50B abut against the respective abutment surface 48A, 48B thereof, the inner surfaces 54A, 54B of each piston 50A, 50B are separated transversally so as to a free a space inside the bore 46, as shown in FIG. 2.

The two pistons 50A, 50B are returned elastically to abut against the abutment surface thereof 48A, 48B respectively by the first elastic return means 30, via the braking segments 18A, 18B.

The separation means 44 include a lever 58 extending generally along a longitudinal axis "Y". The lever 58 includes a first actuation end 60, which is represented at the bottom of FIG. 2, and a second hinge end 62, which is represented at the top of FIG. 2. The hinge end 62 is arranged inside the bore 46, between the two pistons 50A, 50B, in favour of an orifice 64 formed in the plate 12 and in the body 42. The actuation end 60 is arranged longitudinally behind the fixed plate 12.

The lever 58 bears transversally via an intermediate section 66 on a pivot 68 which is slidably rigidly connected with the first bearing surface 32A. In the example shown in FIG. 2, the pivot 68 is arranged on the inner end surface 54A of the first piston 50A. The pivot 68 is offset to the rear end of the surface 54A with respect to the sliding axis "X" of the pistons 50A, 50B.

The second hinge end 62 of the lever 58 is hinged with a first inner end 70 of a connecting rod 72. The second outer end 74 of the connecting rod 72 being suitable for actuating the second bearing surface 32B transversally. The connecting rod 72 has a generally transversal axis "Z". The connecting rod 72 is herein formed by a tappet. The first inner end 70 thereof is received in a recess of the lever 58 to form a ball joint so as to pivot about a first vertical axis. Similarly, the second outer end 74 is received in a recess of the inner end surface 54B of the second piston 50B to form a ball joint so as to pivot about a second vertical axis. The second end 74 is in contact with the base of the recess thereof substantially at the sliding axis "X" of the second piston 50B.

The lever 58 is controlled to pivot between:
an idle position, as shown in FIG. 2, to which it is returned elastically by the first elastic return means 30, and wherein the connecting rod 72 is slightly inclined with respect to the sliding axis "X" so that the two bearing surfaces 32A, 32B of the pistons 50A, 50B occupy the anchoring position thereof anchoring position thereof against the abutment surfaces 48A, 48B;
an active position, as shown in FIG. 5, wherein the lever 58 bears transversally on the pivot 68 of the first piston 50A to actuate the second bearing surface 32B by pivoting the connecting rod 72 towards the transversal direction so as to separate the two bearing surfaces 32A, 32B towards the sliding position thereof.

In the idle position of the lever 58, the inner end 70 of the connecting rod 72 is offset longitudinally to the front of the sliding axis "X". As such, the pivot 68 and the inner end 70 of the connecting rod 72 are arranged longitudinally on either side of the sliding axis "X", whereas the outer end 74 of the connecting rod 72 remains substantially on the sliding axis "X".

In the active position of the lever 58, the main axis "Y" of the connecting rod 72 is oriented substantially transversally, so as to provide a maximum transversal separation between the two bearing surfaces 32A, 32B. Nevertheless, to prevent jamming of the lever 58 in the active position thereof, the pivoting of the connecting rod 72 is designed to stop slightly before reaching the strictly transversal position.

When the lever 58 occupies the idle position thereof, the two bearing surfaces 32A, 32B are simultaneously returned to abut against the associated abutment surfaces 48A, 48B of the body 42 by the associated segments 18A, 18B to enable the operation in "simplex" mode of the drum brake 10. The body 42 of the anchoring element 28 thus forms a fixed transversal brace with respect to the plate 12.

When the lever 58 occupies the active position thereof, the bearing surfaces 32A, 32B are separated transversally from one another. The surfaces 56A, 56B of the pistons 50A, 50B are separated transversally by a distance greater than that separating the abutment surfaces 48A, 48B of the body 42. Moreover, the orifice 64 for passing the lever 58 is sufficiently large to enable the transversal sliding of the assembly formed by the two pistons 50A, 50B, the lever 58 in the active position and the connecting rod 72. The separation means 44 thus form a sliding brace suitable for sliding transversally with respect to the plate 12 and with respect to the body 42. This position is used for operation of the drum brake 10 in "servo-dual" mode.

The switch to "servo-dual" mode may be performed when the wheel cylinder 34 is idle, but also when the wheel cylinder 34 is active.

In the first case, the drum brake 10 is initially unused, the wheel cylinder 34 being idle. The separation means 44 make it possible to control alone the clamping of the braking segments 18A, 18B. For this purpose, the separation of the two bearing surfaces 32A, 32B in the sliding position is sufficient to enable the clamping of the two braking segments 18A, 18B against the friction skirt 16 by separating the two lower ends 24 of the segments 18A, 18B.

In the second case, the wheel cylinder 34 is initially in the active state thereof. Each segment 18A, 18B thus occupies the active position thereof by separating the two upper ends 22. While keeping the wheel cylinder 34 in the active state thereof, the vehicle driver activates the parking brake. The "servo-dual" mode is thus engaged, while the "simplex" mode is already activated. The bearing surfaces 32A, 32B are ordered to the sliding position thereof by a defined actuation force applied by the movement of a control member, for example a brake cable 76. The segments 18A, 18B are then ordered to the active position thereof simultaneously by the wheel cylinder 34 and by the separation means 44.

Then, the driver orders the wheel cylinder 34 to the idle state thereof, only the separation means 44 then keeping the segments 18A, 18B in the active position thereof.

However, when the wheel cylinder 34 is already active, it was observed that the segments 18A, 18B impeded the separation of the bearing surfaces 32A, 32B to the sliding position thereof. When the upper ends 22 of the segments 18A, 18B are already separated, it is indeed not possible to separate the lower ends 24 thereof by applying the defined actuation force. The actuation force of the separation means 44 is thus attained while the pistons 50A, 50B are not sufficiently separated to keep the segments 18A, 18B in the active state thereof alone.

However, the movement of the control member of the separation means 44 is interrupted once the defined actuation force is attained. Hence, when the wheel cylinder 34 is deactivated, the upper ends 22 of the segments 18A, 18B are no longer separated, and the lower ends 24 thereof are insufficiently separated by the separation means 44. Therefore, there is no more braking despite the fact that the driver has activated the "servo-dual" function.

To solve this problem, an elastic member 80 is inserted in the transmission chain of the actuation force "Ft" to the first piston 50A. This elastic member 80 has a stiffness and a deformability suitable for storing the mechanical energy supplied by the control member when the wheel cylinder 34 is active. In other words, when the defined actuation force is insufficient to move the lower end of the segments 18A, 18B, the elastic member 80 is deformed to store mechanical energy.

As such, when the wheel cylinder 34 is deactivated, the elastic member 80 restores the mechanical energy stored in the form of a defined actuation force by separating the two pistons 50A, 50B from one another in order to keep the segments 18A, 18B constantly in the active position thereof. The decrease in separation of the upper ends 22 of the segments 18A, 18B is then compensated simultaneously by the increase in separation of the lower ends 24 thereof caused by the elastic member 80.

The actuation end 60 of the lever 58 is suitable for being pulled towards the active position thereof, against the return force applied by the spring 30, by means of a brake cable 76. The cable 76 includes a fastening end 78 on the lever 58 which makes it possible to pull the lever 58 to press the lever 58 against the pivot 68. The actuation force of the brake cable 76 is applied to an opposite pulling end (not shown) in order to pull the brake cable 76.

It was observed that, when the braking segments 18A, 18B are applied against the skirt 16 of the drum 14, the slightest pulling movement of the brake cable 76 suddenly increases the force applied by the separation means 44 on the braking segments 18A, 18B. This feature denotes a high rigidity of the control of the drum brake 10 in "servo-dual" mode.

To make the control more flexible, it is necessary to ensure that the ratio between the force applied by the segments 18A, 18B on the drum 14 and the pulling stroke of the brake cable 76 is lowered. This is carried out herein by inserting the elastic member 80 of defined stiffness in the transmission chain of the actuation force between the pulling end of the brake cable 76 and the first piston 50A.

In the example shown in FIG. 2, the brake cable 76 is divided into a first strand 82 bearing the pulling end and a second strand 84 bearing the fastening end 78. The elastic member 80 is inserted between two separate strands 82, 84 of the brake cable 76. The two strands 82, 84 are connected to one another by a connection end.

A radial mount 86 is attached to the connection end of the fastening strand 84. This mount 86 is slidably mounted along the axis of the fastening strand 84 in a sleeve 88 which is attached to the connection end of the pulling strand 82. The free end of the sleeve 88 includes an axial end base 90 which has a central orifice for the passage of the fastening strand 84. The elastic member 80 is formed by a compression spring which is inserted axially between the mount 86 of the fastening strand 84 and the base 90 of the sleeve 88. As such, when the tension of the brake cable 76, induced by the actuation force, exceeds a predetermined value, the elastic member 80 starts to be compressed, thus making it possible to increase the pulling stroke of the pulling strand 82 while moderately increasing the pulling force in the fastening strand 84.

Figure 6:
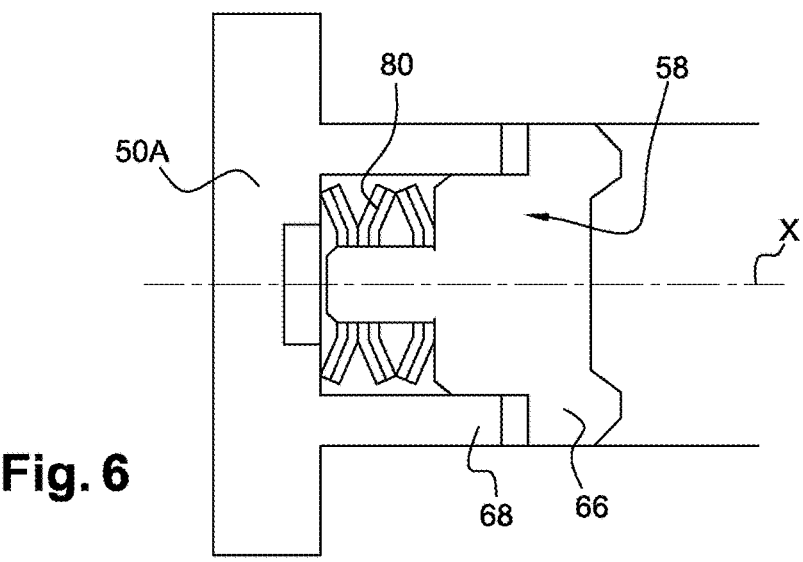
FIG. 6 is a sectional view representing an alternative embodiment of the separation means according to the first embodiment, wherein the elastic washers are inserted between the first piston and the lever.

According to one alternative embodiment represented in FIG. 6, the elastic member 80 is formed by "Belleville" type spring washers, inserted between the intermediate portion 66 of the lever 58 and the first piston 50A.

The operation of the drum brake 10 in "simplex" mode is now described with reference to FIGS. 1 and 2.

In this operating mode, the lever 58 remains in the idle position. As such, the pistons 50A, 50B constantly occupy the anchoring position thereof wherein they abut against the respective abutment surface 48A, 48B thereof. The bearing surfaces 32A, 32B of the braking segments 18A, 18B are thus fixed throughout the operation of the drum brake 10 in "simplex" mode, as represented in FIG. 2.

As explained above, the braking segments 18A, 18B are pushed to the active position thereof by the wheel cylinder 34. The braking segments 18A, 18B then pivot about the bearing point thereof on the respective bearing surface 32A, 32B thereof. No force is transmitted from one braking segment 18A, 18B to the other by the anchoring element 48.

At the end of the braking operation in "simplex" mode, the braking segments 18A, 18B are returned elastically to the idle position thereof by the elastic return means 30, 36.

The operation of the drum brake 10 in "servo-dual" mode is now described with reference to FIGS. 2 to 5.

During this operating mode, the wheel cylinder 34 remains idle. At the start of the braking operation, the pistons 50A, 50B occupy the anchoring position thereof, and the lever 58 occupies the idle position thereof as shown in FIG. 2.

Figure 3:
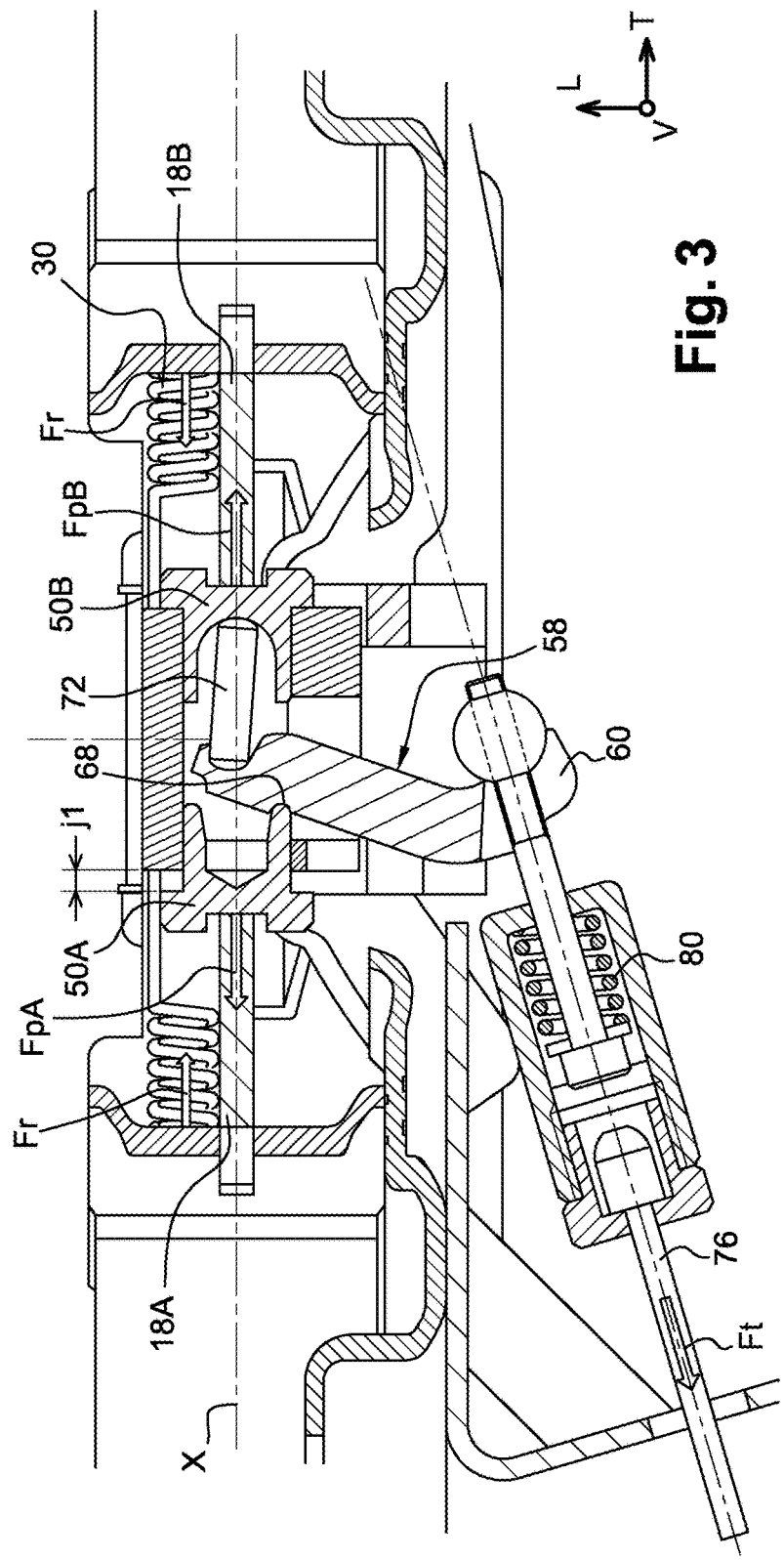
FIG. 3 is a similar view to that in FIG. 2 wherein the bearing surface of the first braking segment is in the process of being separated.

Then, during a first step for moving the first braking segment 18A illustrated in FIG. 3, the brake cable 76 is pulled with an actuation force "Ft" so as to actuate the actuation end 60 of the lever 58. The lever 58 pivots while bearing on the pivot 68 of the first piston 50A. This causes pivoting of the connecting rod 72 to the transversal position thereof. During this pivoting, the lever 58 applies a first transversal force "FpA" on the first piston, and a second transversal force "FpB" on the second piston 50B via the connecting rod 72. These two forces "FpA" and "FpB" tend to separate the pistons 50A, 50B against the elastic return force "Fr" applied by the elastic return means 30 via the braking segments 18A, 18B.

Due to the inclination of the connecting rod 72, the first transversal force "Fp1" has an intensity greater than that of the force "Fp2". However, the elastic return forces "Fr" are both equal. Sliding of the first piston 50A is thus observed when the first force "Fp1" compensates for the elastic return force "Fr", while the second piston 50B remains immobile as the second force "Fp2" is once again exceeded by the elastic return force "Fr".

The first piston 50A thus slides by a stroke "j1", thus moving the first braking segment 18A towards the skirt 16 of the drum 14.

The actuation force applied in the brake cable 76 starts to compress the elastic member 80. During this step, the brake cable 76 is for example pulled by 2.35 mm while the first piston 50A slides by 0.6 mm.

Figure 4:
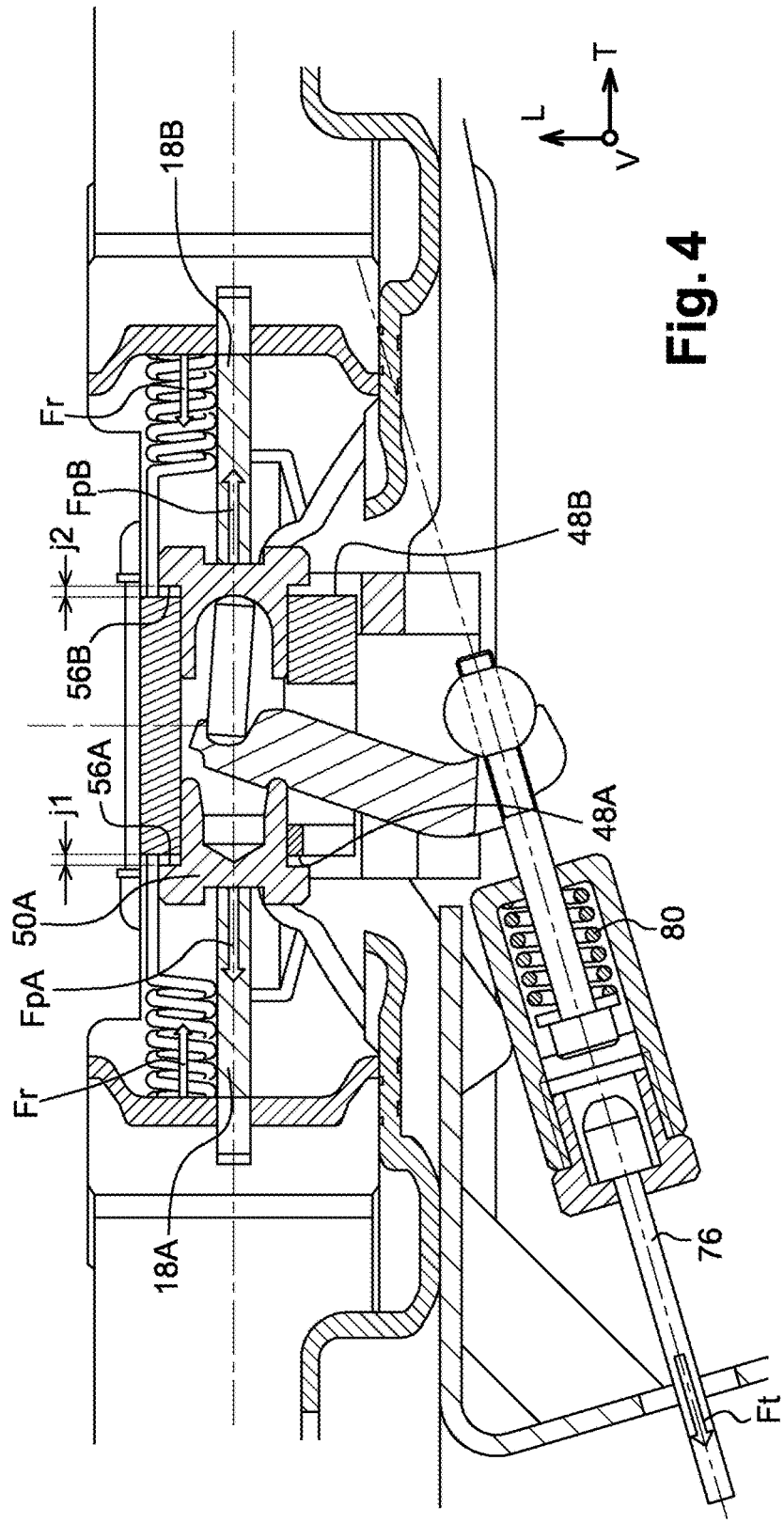
FIG. 4 is a similar view to that in FIG. 2 wherein the bearing surface of the second braking segment is in the process of being separated, the bearing surface of the first braking segment being already separated.

When the first braking segment 18A is pressed against the skirt 16 of the drum 14, a second step for moving the second braking segment 18B starts, as illustrated in FIG. 4. The first braking segment 18A being pressed against the drum 14, the sliding of the first piston 50A is stopped.

During this second step, the actuation force "Ft" in the cable 76 is intensified by a contact reaction between the first braking segment 18A and the drum 14. This actuation force is sufficient to increase the intensity of the second force "FpB" on the second piston 50B. This force "FpB" then compensates for the elastic return force "Fr" of the second braking segment 18B. The second piston 50B slides outwards by a stroke "j2", pushing the second braking segment 18B towards the skirt 16 of the drum 14.

Under the effect of the increase of the actuation force, the elastic member 80 of the brake cable 76 is compressed a little further. During this second step, the brake cable 76 is pulled further, for example by a further 1.89 mm, whereas the second piston 50B slides, for example by 0.6 mm.

At the end of this second step, the stopping surfaces 56A, 56B of each of the pistons 50A, 50B are separated by 0.6 mm from the respective abutment surface 48A, 48B thereof.

Then, during a final locking step, the segments 18A, 18B are actuated by the drum 14, as shown in FIG. 5.

When the drum 14 is subject to a motor torque tending to drive the wheel forwards, herein in an anticlockwise direction with reference to FIG. 1, the first braking segment 18A is driven towards the body 42 of the anchoring element 28 with a force "Fc". The first braking segment 18A thus presses on the first piston 50A until it abuts against the first associated abutment surface 48A.

The lever 58 and the connecting rod 72 form a sliding brace with respect to the body 42. As such, the force "Fc" applied to the first braking segment 18A is transmitted to the second piston 50B via the lever 58 and the connecting rod 72. The lever 58 and the connecting rod 72 being free to slide rigidly connected with the pistons 50A, 50B, the sliding of the first piston 50A actuates the sliding of the second piston 50B via the lever 58 and the connecting rod 72. The actuation force "Ft" of the brake cable 76 remains sufficient to keep the lever 58 in the active position despite the movement thereof.

As such, the force "Fc" applied by the torque to the drum 14 thus presses very strongly the bottom of the second braking segment 18B against the skirt 16, thus increasing the braking torque.

With reference to FIG. 1, the second braking segment 18B thus pushed against the skirt 16, is subject to the drive torque of the drum 14. This torque tends to move the second braking segment 18B in an anticlockwise direction with great force. This force is transmitted by the second segment 18B to the upper part of the first braking segment 18A by means of the connecting rod 38.

This further increases the adherence of the first braking segment 18A to the drum 14, and thus increases the braking torque.

As shown in FIG. 5, under the effect of the drive torque of the drum 14, the braking segments 18A, 18B are deformed, causing an additional stroke of the second piston 50B, whereas the first piston 50A is already abutting against the body 42. This is followed by an increase in the transversal separation between the two bearing surfaces 32A, 32B. The stopping surface 56B of the second piston 50B is then separated with respect to the abutment surface 48B thereof by a distance "j1+j2+jc".

This increase in separation causes further pivoting of the lever 58. The pulling stroke of the brake cable 76 is thus increased under the effect of the drive torque of the drum 14. This additional stroke is absorbed at least in part by the compression of the elastic member 80.

In this "servo-dual" operating mode, the two braking segments 18A, 18B are compressed.

When the drum 14 is subject to a drive torque in reverse, i.e. in a clockwise direction according to FIG. 1, the final locking step is similar to the final locking step in forward drive, except that the assembly formed by the piston 50A, 50B, the lever 58 and the connecting rod 72 slides to the first braking segment 18A due to the inversion of the motor torque. As such, at the end of the locking step, the first piston 50A is separated from the first abutment surface 48A, while the second piston 50B abuts against the second abutment surface 48B. However, the lever 58 sliding to the left, the brake cable 76 is not subject to a further pulling effect as in the case of forward drive.

Figure 7:
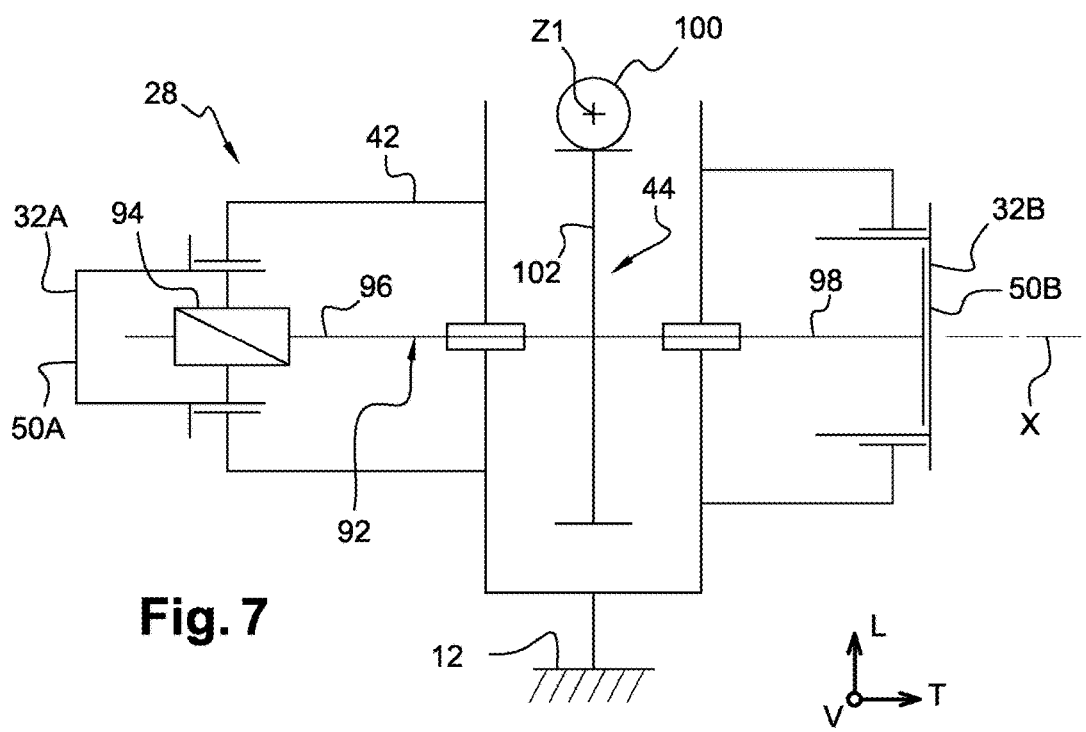
FIG. 7 is a schematic view along the sectional plane 2-2 representing a second embodiment of the separation means using a screw-nut mechanism.
Figure 8:
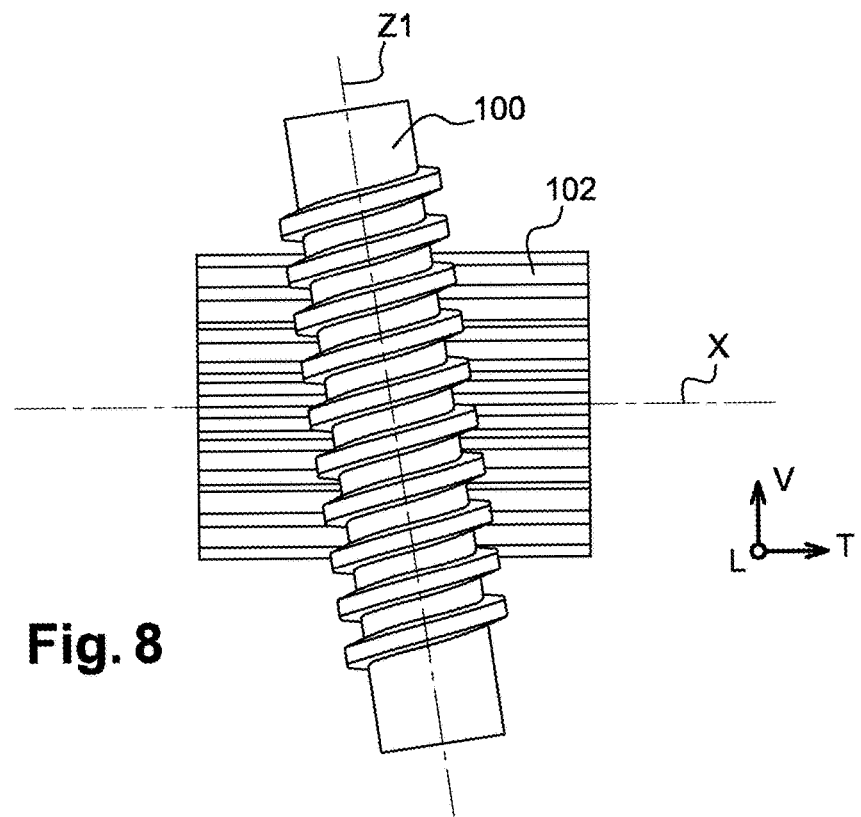
FIG. 8 is a top view of FIG. 7 showing the inclination of the axis of a screw with no screw-nut control mechanism with respect to the axis of rotation of a control pinion of the screw-nut mechanism.

FIGS. 7 and 8 represent a second embodiment of the invention wherein the means 44 for separating the two pistons 50A, 50B have been replaced by a screw-nut mechanism suitable for controlling the transversal separation between the two bearing surfaces 32A, 32B by relative rotation of a screw 92 with respect to a nut 94.

In the example shown in FIG. 7, the nut 94 is fixedly mounted in rotation with respect to the body 42 and slidably rigidly connected with the first piston 50A. The screw 92 is rotatably mounted about the transversal sliding axis "X" with respect to the fixed body 42 of the anchoring element 28. Moreover, the screw 92 is free to slide in the body 42 along the sliding axis "X" thereof.

A first threaded end 96 of the screw 92 is received in a complementary internal screw thread of the nut 94, whereas the other end 98 of the screw 92 is received in an inner end recess of the second piston 50B. The second end 98 of the screw 92 is received free in rotation in the recess, and it bears transversally against a rear surface of the second piston 50B.

Advantageously, similarly to the example in FIG. 6, an elastic member 80, formed for example by a stack of Belleville type washers, is inserted between the free end 98 of the screw 92 and the rear surface of the second piston 50B.

As such, when the screw 92 is turned in a first direction, it tends to separate transversally the pistons 50A, 50B from one another by pressing, on one hand, on the nut 94 of the first piston 50A and, on the other, on the rear surface of the second piston 50B.

When the screw 92 is turned in the second opposite direction, the pistons 50A, 50B are free to be pushed to the anchoring position thereof by the braking segments 18A, 18B.

The rotation of the screw 92 is controlled by means of an endless screw 100 which is provided with a helicoidal groove. This endless screw 100 is for example rotated by a controlled electric motor (not shown) which acts as the control member of the separation means 44.

The endless screw 100 is engaged with the peripheral teeth of a pinion 102 rigidly connected in rotation with the screw 92. The pinion 102 is herein arranged transversally between the two pistons 50A, 50B. The pinion 102 is attached to the screw 92.

So that the drum brake 10 can operate in "servo-dual" mode, as described in the first embodiment, it is necessary for the assembly formed by the pistons 50A, 50B, the screw 92 and the nut 94 to be able to slide freely in the body 42.

For this, as shown in FIG. 8, the axis "Z1" of rotation of the endless screw 100 is arranged so as to enable transversal sliding of the pinion 102 with respect to the endless screw 100 while now retaining the relative engagement thereof throughout the transversal stroke of the pinion 102. As such, the pinion 102 has straight teeth extending along the transversal direction, whereas the helicoidal groove of the endless screw 100 is arranged tangentially to the transversal direction. The axis "Z1" of the endless screw is thus slightly inclined with respect to an orthogonal direction to the transversal direction.

Alternatively, the pinion is mounted rigidly connected in rotation with the screw of the screw-nut mechanism but free to slide on said screw of the screw-nut mechanism.

The operation of the drum brake 10 equipped with the separation means 44 embodied according to the second embodiment of the invention is the same as for the first embodiment of the invention.

Figure 9:
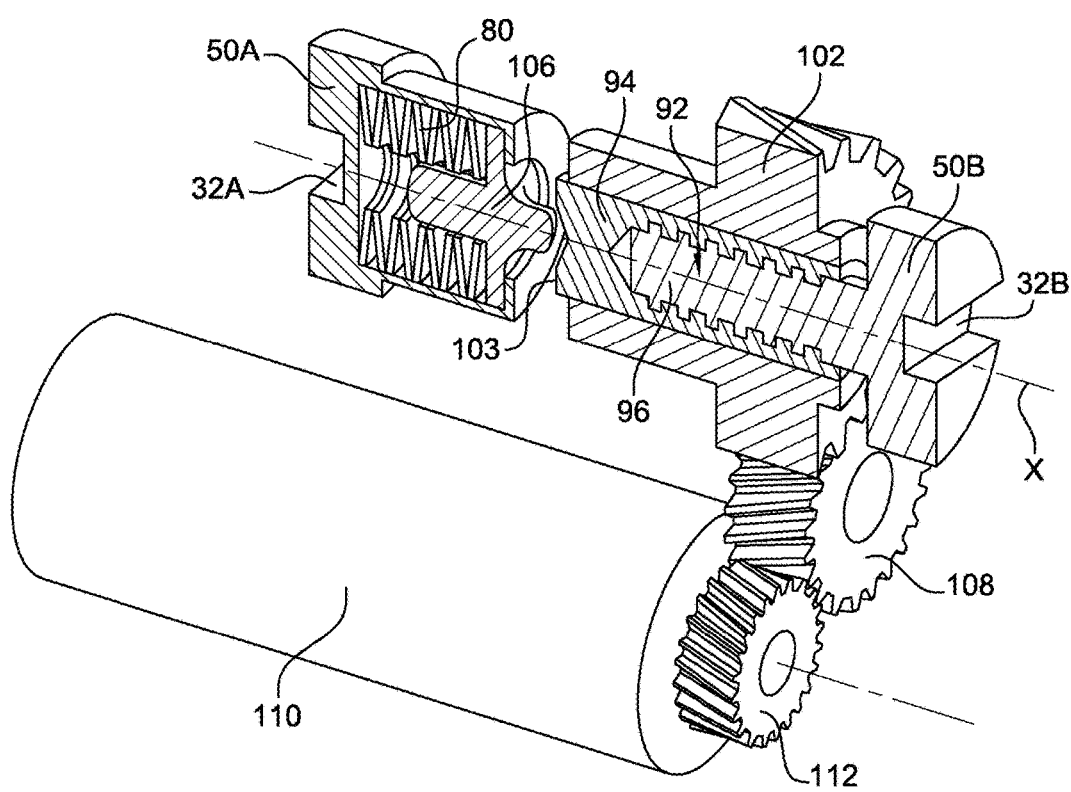
FIG. 9 is a perspective view representing a third embodiment of the invention using a similar screw-nut mechanism to that in FIG. 7 and wherein the screw-nut control mechanism is embodied by a cogwheel driven by a motor.

According to a third embodiment of the invention represented in FIG. 9, the separation means 44 are identical to the separation means of the second embodiment. However, the electric motor actuates herein the rotation of the nut 94 or the screw 92 by means of at least one cogwheel which is engaged with the teeth of a pinion 102 borne by the nut 94 or the screw 92, and not by means of an endless screw as in the case of the second embodiment.

In the example shown in FIG. 9, the screw 92 is fixedly mounted in rotation with respect to the fixed body and rigidly connected for sliding with the second piston 50B.

The nut 94 is rotatably mounted about the transversal sliding axis "X" with respect to the fixed body of the anchoring element. Moreover, the nut 94 is free to slide in the body along the sliding axis "X" thereof.

A first threaded end 96 of the screw 92 is received in a complementary internal screw thread of the nut 94, whereas the other end 98 of the screw 92 includes a head forming the second piston 50B. A groove formed in the head of the screw 92 is intended to engage with the associated segment 18B to lock the screw 92 in rotation.

A free transversal end surface 103 of the nut 94, facing the first piston 50A, is intended to transversally actuate a slide 106 which is received sliding transversally in a recess of the first piston 50A.

An elastic member 80, formed for example by a transversal stack of Belleville type washers, is inserted transversally between the slide 106 and the first piston 50A.

As such, when the nut 94 is turned in a first direction, it tends to separate transversally the pistons 50A, 50B from one another by pressing, on one hand, on the screw 92 of the second piston 50B and, on the other, on the first piston 50A via the slide 106 and the elastic member 80.

When the nut 94 is turned in a second opposite direction, the pistons 50A, 50B are free to be pushed to the anchoring position thereof by the braking segments 18A, 18B.

The rotation of the nut 94 is controlled by means of at least one axis cogwheel 108 which is engaged directly with the teeth of a pinion 102 borne by the nut 94. The cogwheel 108 is herein rotatably mounted about a transversal axis parallel with the sliding axis "X" of the pistons 50A, 50B.

This cogwheel 108 is for example rotated by a controlled electrical motor 110 which acts as the control member of the separation means 44 by means of a drive pinion 112 which is rotatably mounted about a transversal axis of rotation of the motor 110.

The cogwheel 108 has herein helicoidal teeth oriented such that the force transmitted by the cogwheel 108 has an axial component opposing the force applied by the second segment 18B on the second piston 50B.

In this third embodiment, the pinion 102 is coaxial with the nut 94 and it is borne rigidly connected in rotation with the nut 94. Moreover, the nut 94 is suitable for sliding with respect to the pinion 102 along the sliding axis "X" so that the pinion 102 remains fixed with respect to the cogwheel 108 even in the case of sliding of the second piston 50B. As such, the assembly formed by the two pistons 50A, 50B and the nut 94 acts as a sliding brace in servo-dual mode.

For example, the pinion 102 is mounted on the nut 94 by means of axial grooves. As such, the pinion 102 is axially fixed whereas the nut 94 can slide in a fluted bore of the pinion 102. The pinion 102 nonetheless transmits a torque about the sliding axis "X" by means of the grooves.

Alternatively, the stopping in rotation of the pinion with respect to the nut, while enabling the relative sliding thereof, can be performed by any other known means, for example by a key, a pin, etc.

Figure 10:
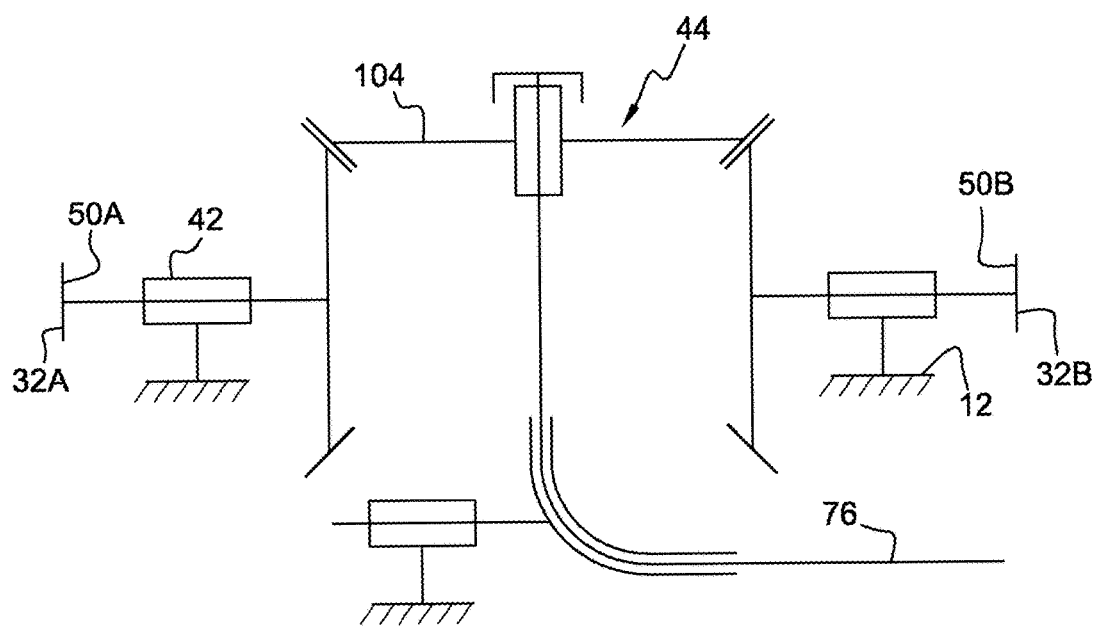
FIG. 10 is a schematic view similar to that in FIG. 7 representing a fourth embodiment of the separation means using a sliding wedge.

According to a fourth embodiment shown in FIG. 10, the separation means 44 include at least one wedge 104 which is slidably mounted orthogonally to the transversal direction between a retracted position wherein the two bearing surfaces 32A, 32B occupy the anchoring position thereof, and an actuated position wherein the two bearing surfaces 32A, 32B occupy the sliding position thereof and to which it is pulled by an actuation force.

The wedge 104 is inserted transversally between the two bearing surfaces 32A, 32B. The wedge 104 is further suitable for sliding transversally rigidly connected with the pistons 50A, 50B.

In the example shown in FIG. 10, the wedge 104 is actuated by a brake cable 76.

As an alternative, not shown, of this third embodiment of the invention, the separation means include two opposite wedges which are suitable for being clamped against one another to separate the pistons transversally.

The operation of the drum brake 10 equipped with such separation means is equivalent to that described for the first embodiment of the invention.

The drum brake 10 embodied according to any one of the embodiments of the invention is thus suitable for operating according to two operating modes. "Simplex" mode allows progressive braking while being controlled only by the wheel cylinder, whereas "servo-dual" mode allows rapid and powerful locking of the vehicle wheels while being controlled only by the separation means.

The invention claimed is:

1. A motor vehicle drum brake (10), comprising:
   a fixed transversal plate (12);
   a drum (14) rotatably mounted with respect to the plate (12) and equipped with a peripheral friction skirt (16);
   two opposite braking segments (18A, 18B) including first transversally facing ends (22) and second transversally facing opposite ends (24);
   an anchoring element (28) inserted transversally between the second ends (24) of the braking segments (18A, 18B) such that each second end (24) is elastically forced to pivotably transversally bear against an associated bearing surface (32A, 32B) of the anchoring element (28); and
   a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16),
   the anchoring (28) including:
      a fixed body (42) with respect to the plate (12),
      two pistons (50A, 50B) each carrying an associated bearing surface (32A, 32B) and which are slidably mounted transversally in the body (42), and
      controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10).

2. The drum brake (10) according to claim 1, wherein the separation means (44) include a wedge (104) which is slidably mounted orthogonally to the transversal direction between a retracted position wherein the two bearing surfaces (32A, 32B) occupy the anchoring position thereof, and an actuated position wherein the two bearing surfaces (32A, 32B) occupy the sliding position thereof and towards which it is pulled by an actuation force, the wedge (104) being inserted transversally between the two pistons (50A, 50B) and the wedge (104) being slidably mounted transversally in a rigidly connected manner with the bearing surfaces (32A, 32B).

3. The drum brake (10) according to claim 2, further comprising:
an elastic member (80) of defined stiffness which is inserted in an actuation force (Ft) transmission chain to one of the two pistons (50A, 50B).

4. The drum brake (10) according to claim 3, wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the elastic member (80) being inserted between two separate strands (82, 84) of the brake cable (76),
the lever (58) being pivotably controlled between:
an idle position wherein the connecting rod (72) is inclined with respect to the transversal direction such that the two bearing surfaces (32A, 32B) occupy the anchoring position thereof, and
an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

5. The drum brake (10) according to claim 3, wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the elastic member (80) being inserted between the intermediate portion (66) of the lever (58) and one of the two pistons (50A, 50B),
the lever (58) being pivotably controlled between:
an idle position wherein the connecting rod (72) is inclined with respect to the transversal direction such that the two bearing surfaces (32A, 32B) occupy the anchoring position thereof, and
an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

6. The drum brake (10) according to claim 3,
wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally,
the elastic member (80) being inserted between:
the screw (92) or the nut (94), and
the first piston (50A) or the second piston (50B),
and the lever (58) being pivotably controlled between:
an idle position wherein the connecting rod (72) is inclined with respect to the transversal direction such that the two bearing surfaces (32A, 32B) occupy the anchoring position thereof, and
an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

7. The drum brake (10) according to claim 1, wherein the separation means (44) include a screw-nut mechanism (92, 94) suitable for controlling the transversal separation between the two bearing surfaces (32A, 32B) by the relative rotation of the screw (92) with respect to the nut (94) which applies an actuation force on the second piston (50B).

8. The drum brake (10) according to claim 7, wherein the rotation of the nut (94) or the screw (92) is controlled by an electric motor.

9. The drum brake (10) according to claim 8, wherein the rotation of the nut (94) or the screw (92) is controlled by means of an endless screw (100) equipped with a helicoidal groove and driven by the electric motor, the endless screw (100) being engaged with the teeth of a pinion (102) rigidly connected in rotation with the nut (94) or the screw (92), the axis (Z1) of rotation of the endless screw (100) being arranged so as to enable transversal sliding of the pinion (102) with respect to the endless screw (100) while maintaining the relative engagement thereof.

10. The drum brake (10) according to claim 8, wherein the electric motor rotates the nut (94) or the screw (92) by means of at least one cogwheel engaged with the teeth of a pinion (102) borne by the nut (94) or the screw (92).

11. The drum brake (10) according to claim 1, wherein the separation means include a lever (58) including a first actuation end (60) and a second hinge end (62), the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the lever (58) being pivotably controlled between:
an idle position wherein the connecting rod (72) is inclined with respect to the transversal direction such that the two bearing surfaces (32A, 32B) occupy the anchoring position thereof, and an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

12. The drum brake (10) according to claim 11, wherein in the sliding position of the bearing surfaces (32A, 32B), the main axis (Z) of the connecting rod (72) is oriented substantially transversally.

13. The drum brake (10) according to claim 11, wherein the actuation end (60) of the lever (58) is suitable for being pulled to the active position thereof by means of a brake cable (76) including an end (78) for fastening on the lever (58) and a pulling end wherein an actuation force (Ft) is applied.

14. The drum brake (10) according to claim 1, wherein the separation of the two bearing surfaces (32A, 32B) in the sliding position is sufficient to enable the clamping of the two braking segments (18A, 18B) against the friction skirt (16).

15. A motor vehicle drum brake (10), comprising:
a fixed transversal plate (12);
a drum (14) rotatably mounted with respect to the plate (12) and equipped with a peripheral friction skirt (16);
two opposite braking segments (18A, 18B) including first transversally facing ends (22) and second transversally facing opposite ends (24);
an anchoring element (28) inserted transversally between the second ends (24) of the braking segments (18A, 18B) such that each second end (24) is elastically forced to pivotably transversally bear against an associated bearing surface (32A, 32B) of the anchoring element (28); and
a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16),
the anchoring element (28) including:
a fixed body (42) with respect to the plate (12),
two pistons (50A, 50B) each carrying an associated bearing surface (32A, 32B) and which are slidably mounted transversally in the body (42), and
controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10),
wherein the separation means include a lever (58) including a first actuation end (60) and a second hinge end (62), the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the lever (58) being pivotably controlled between:
an idle position wherein the connecting rod (72) is inclined with respect to the transversal direction such that the two bearing surfaces (32A, 32B) occupy the anchoring position thereof, and
an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

16. The drum brake (10) according to claim 15, wherein in the sliding position of the bearing surfaces (32A, 32B), the main axis (Z) of the connecting rod (72) is oriented substantially transversally.

17. The drum brake (10) according to claim 15, wherein the actuation end (60) of the lever (58) is suitable for being pulled to the active position thereof by means of a brake cable (76) including an end (78) for fastening on the lever (58) and a pulling end wherein an actuation force (Ft) is applied.

18. A motor vehicle drum brake (10), comprising:
a fixed transversal plate (12);
a drum (14) rotatably mounted with respect to the plate (12) and equipped with a peripheral friction skirt (16);
two opposite braking segments (18A, 18B) including first transversally facing ends (22) and second transversally facing opposite ends (24);
an anchoring element (28) inserted transversally between the second ends (24) of the braking segments (18A, 18B) such that each second end (24) is elastically forced to pivotably transversally bear against an associated bearing surface (32A, 32B) of the anchoring element (28); and
a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16),
the anchoring element (28) including:
a fixed body (42) with respect to the plate (12),
two pistons (50A, 50B) each carrying an associated bearing surface (32A, 32B) and which are slidably mounted transversally in the body (42), and
controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10),
wherein the separation means (44) include a screw-nut mechanism (92, 94) suitable for controlling the transversal separation between the two bearing surfaces (32A, 32B) by the relative rotation of the screw (92) with respect to the nut (94) which applies an actuation force on the second piston (50B), wherein the rotation of the nut (94) or the screw (92) is controlled by an electric motor, and wherein the rotation of the nut (94) or the screw (92) is controlled by means of an endless screw (100) equipped with a helicoidal groove and driven by the electric motor, the endless screw (100) being engaged with the teeth of a pinion (102) rigidly connected in rotation with the nut (94) or the screw (92), the axis (Z1) of rotation of the endless screw (100) being arranged so as to enable transversal sliding of the pinion (102) with respect to the endless screw (100) while maintaining the relative engagement thereof.

19. A motor vehicle drum brake (10), comprising:

a fixed transversal plate (12);

a drum (14) rotatably mounted with respect to the plate (12) and equipped with a peripheral friction skirt (16);

two opposite braking segments (18A, 18B) including first transversally facing ends (22) and second transversally facing opposite ends (24);

an anchoring element (28) inserted transversally between the second ends (24) of the braking segments (18A, 18B) such that each second end (24) is elastically forced to pivotably transversally bear against an associated bearing surface (32A, 32B) of the anchoring element (28); and a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16), the anchoring element (28) including:
  a fixed body (42) with respect to the plate (12),
  two pistons (50A, 50B) each carrying an associated bearing surface (32A, 32B) and which are slidably mounted transversally in the body (42), and
  controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10), wherein the separation means (44) include a screw-nut mechanism (92, 94) suitable for controlling the transversal separation between the two bearing surfaces (32A, 32B) by the relative rotation of the screw (92) with respect to the nut (94) which applies an actuation force on the second piston (50B), wherein the rotation of the nut (94) or the screw (92) is controlled by an electric motor, and wherein the electric motor rotates the nut (94) or the screw (92) by means of at least one cogwheel engaged with the teeth of a pinion (102) borne by the nut (94) or the screw (92).

20. A motor vehicle drum brake (10), comprising:

a fixed transversal plate (12);

a drum (14) rotatably mounted with respect to the plate (12) and equipped with a peripheral friction skirt (16);

two opposite braking segments (18A, 18B) including first transversally facing ends (22) and second transversally facing opposite ends (24);

an anchoring element (28) inserted transversally between the second ends (24) of the braking segments (18A, 18B) such that each second end (24) is elastically forced to pivotably transversally bear against an associated bearing surface (32A, 32B) of the anchoring element (28); and a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16), the anchoring element (28) including:
  a fixed body (42) with respect to the plate (12),
  two pistons (50A, 50B) each carrying an associated bearing surface (32A, 32B) and which are slidably mounted transversally in the body (42), and
  controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10), wherein the separation means (44) include a wedge (104) which is slidably mounted orthogonally to the transversal direction between a retracted position wherein the two bearing surfaces (32A, 32B) occupy the anchoring position thereof, and an actuated position wherein the two bearing surfaces (32A, 32B) occupy the sliding position thereof and towards which it is pulled by an actuation force, the wedge (104) being inserted transversally between the two pistons (50A, 50B) and the wedge (104) being slidably mounted transversally in a rigidly connected manner with the bearing surfaces (32A, 32B), wherein an elastic member (80) of defined stiffness is inserted in an actuation force (Ft) transmission chain to one of the two pistons (50A, 50B), and wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot

(68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the elastic member (80) being inserted between two separate strands (82, 84) of the brake cable (76), the lever (58) being pivotably controlled between:
- an idle position wherein the connecting rod (72) is inclined with respect to the transversal direction such that the two bearing surfaces (32A, 32B) occupy the anchoring position thereof, and
- an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

21. A motor vehicle drum brake (10), comprising:
a fixed transversal plate (12);
a drum (14) rotatably mounted with respect to the plate (12) and equipped with a peripheral friction skirt (16);
two opposite braking segments (18A, 18B) including first transversally facing ends (22) and second transversally facing opposite ends (24);
an anchoring element (28) inserted transversally between the second ends (24) of the braking segments (18A, 18B) such that each second end (24) is elastically forced to pivotably transversally bear against an associated bearing surface (32A, 32B) of the anchoring element (28); and
a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16),
the anchoring element (28) including:
  a fixed body (42) with respect to the plate (12),
  two pistons (50A, 50B) each carrying an associated bearing surface (32A, 32B) and which are slidably mounted transversally in the body (42), and
  controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10),
wherein the separation means (44) include a wedge (104) which is slidably mounted orthogonally to the transversal direction between a retracted position wherein the two bearing surfaces (32A, 32B) occupy the anchoring position thereof, and an actuated position wherein the two bearing surfaces (32A, 32B) occupy the sliding position thereof and towards which it is pulled by an actuation force, the wedge (104) being inserted transversally between the two pistons (50A, 50B) and the wedge (104) being slidably mounted transversally in a rigidly connected manner with the bearing surfaces (32A, 32B),
wherein an elastic member (80) of defined stiffness is inserted in an actuation force (Ft) transmission chain to one of the two pistons (50A, 50B), and
wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the elastic member (80) being inserted between the intermediate portion (66) of the lever (58) and one of the two pistons (50A, 50B), the lever (58) being pivotably controlled between:
- an idle position wherein the connecting rod (72) is inclined with respect to the transversal direction such that the two bearing surfaces (32A, 32B) occupy the anchoring position thereof, and
- an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

22. A motor vehicle drum brake (10), comprising:
a fixed transversal plate (12);
a drum (14) rotatably mounted with respect to the plate (12) and equipped with a peripheral friction skirt (16);
two opposite braking segments (18A, 18B) including first transversally facing ends (22) and second transversally facing opposite ends (24);
an anchoring element (28) inserted transversally between the second ends (24) of the braking segments (18A, 18B) such that each second end (24) is elastically forced to pivotably transversally bear against an associated bearing surface (32A, 32B) of the anchoring element (28); and
a wheel cylinder (34) which, in a simplex operating mode of the drum brake (10), is suitable for transversally separating the two adjacent first ends (22) of the braking segments (18A, 18B), pivoting the braking segments (18A, 18B) about the fixed bearing surface (32A, 32B) thereof with respect to the plate (12), to apply a friction surface (20) surface of each braking segment (18A, 18B) against the friction skirt (16),
the anchoring element (28) including:
  a fixed body (42) with respect to the plate (12),
  two pistons (50A, 50B) each carrying an associated bearing surface (32A, 32B) and which are slidably mounted transversally in the body (42), and
  controlled means (44) for transversal separation of the bearing surfaces (32A, 32B) between i) an anchoring position wherein the pistons (50A, 50B) are clamped simultaneously against an associated abutment surface (48A, 48B) of the body (42) by the associated segments (18A, 18B) to enable operation in the simplex mode of the drum brake (10), the body (42) acting as a fixed brace, and ii) a sliding position wherein the bearing surfaces (32A, 32B) are separated from one another, the separating means (44) acting as a sliding brace to enable rigidly connected and free sliding of the bearing pistons (50A, 50B) with respect to the fixed body (42) during operation in a servo-dual mode of the drum brake (10), wherein the separation means (44) include a wedge (104) which is slidably mounted orthogonally to the transversal direction between a retracted position wherein the two bearing surfaces (32A, 32B) occupy the anchoring position thereof, and an actuated position wherein the two bearing surfaces (32A, 32B) occupy the sliding position thereof and towards which it is pulled by an actuation force, the wedge (104) being inserted transversally between the two pistons (50A, 50B) and the wedge (104) being slidably mounted transversally in a rigidly connected manner with the bearing surfaces (32A, 32B), wherein an elastic member (80) of defined stiffness is inserted in an actuation force (Ft) transmission chain to one of the two pistons (50A, 50B), and wherein the separation means include a lever (58) including a first actuation end (60) and a second hinge end (62), the actuation end (60) of the lever (58) being suitable for being pulled to the active position thereof by a brake cable (76) including an end (78) for fastening on the lever (58) and a pulling end wherein an actuation force (Ft) is applied the lever (58) bearing transversally by an intermediate section (66) on a pivot (68) which is slidably rigidly connected with the first piston (50A) of the anchoring element (28), the second end (62) of the lever (58) being hinged with a first end (70) of a connecting rod (72), the second end (74) of the connecting rod (72) being suitable for actuating the second piston (50B) transversally, the elastic member (80) being inserted between:
   the screw (92) or the nut (94), and
   the first piston (50A) or the second piston (50B),
and the lever (58) being pivotably controlled between:
   an idle position wherein the connecting rod (72) is inclined with respect to the transversal direction such that the two bearing surfaces (32A, 32B) occupy the anchoring position thereof, and
   an active position wherein the lever (58) bears transversally on the first piston (50A) to actuate the second piston (50B) by pivoting the connecting rod (72) towards the transversal direction in order to separate the two bearing surfaces (32A, 32B) to the sliding position thereof.

\* \* \* \* \*